United States Patent
Li et al.

(10) Patent No.: US 12,347,030 B1
(45) Date of Patent: Jul. 1, 2025

(54) MONOCULAR VIDEO-BASED THREE-DIMENSIONAL RECONSTRUCTION AND DEPTH PREDICTION METHOD AND SYSTEM FOR PIPELINE

(71) Applicant: CHINA UNIVERSITY OF MINING AND TECHNOLOGY, BEIJING, Beijing (CN)

(72) Inventors: Ce Li, Beijing (CN); Qin Han, Beijing (CN); Feng Yang, Beijing (CN); Suping Peng, Beijing (CN)

(73) Assignee: CHINA UNIVERSITY OF MINING AND TECHNOLOGY, BEIJING, Beijing (CN)

( * ) Notice: Subject to any disclaimer, the term of this patent is extended or adjusted under 35 U.S.C. 154(b) by 0 days.

(21) Appl. No.: 18/733,585

(22) Filed: Jun. 4, 2024

(30) Foreign Application Priority Data

Jan. 31, 2024 (CN) .......................... 202410129446.8

(51) Int. Cl.
  *G06T 17/00* (2006.01)
  *G06T 7/80* (2017.01)
  (Continued)

(52) U.S. Cl.
  CPC .............. *G06T 17/00* (2013.01); *G06T 7/80* (2017.01); *G06V 10/44* (2022.01); *G06V 10/462* (2022.01);
  (Continued)

(58) Field of Classification Search
  CPC . G06T 17/00; G06T 7/80; G06T 2207/20081; G06V 10/44; G06V 10/462; G06V 10/771
  See application file for complete search history.

(56) References Cited

U.S. PATENT DOCUMENTS

| | | | |
|---|---|---|---|
| 2010/0309286 A1* | 12/2010 | Chen | H04N 13/207 375/E7.076 |
| 2021/0181119 A1* | 6/2021 | Michaud | G06F 16/535 |
| 2022/0327727 A1* | 10/2022 | Pérez Cortés | H04N 23/90 |

FOREIGN PATENT DOCUMENTS

| | | | | |
|---|---|---|---|---|
| CN | 208503767 U | * | 2/2019 | F16L 55/28 |
| WO | WO-2023159180 A1 | * | 8/2023 | |

OTHER PUBLICATIONS

Shang Z, Shen Z. Single-pass inline pipeline 3D reconstruction using depth camera array. Automation in Construction. Jun. 1, 2022; 138:104231 (Year: 2022).*

(Continued)

*Primary Examiner* — Maurice L. McDowell, Jr.

(57) ABSTRACT

A monocular video-based three-dimensional reconstruction and depth prediction method and system for a pipeline are provided, relating to the technical field of deep learning and image processing. The method includes the following steps: performing feature extraction and matching and incremental reconstruction on collected image sequences of different pipeline scenes based on the COLMAP method to obtain a camera external parameter matrix corresponding to each image, and constructing a pipeline three-dimensional reconstruction dataset; training the Fast-MVSNet network and the PatchMatchNet network using the existing public datasets, and selecting an optimal network model from multiple trained network models for three-dimensional reconstruction and depth prediction of an actual pipeline scene. A holistic framework from a monocular video to a three-dimensional scene is constructed, which can effectively achieve three-dimensional reconstruction and depth prediction of a drainage pipeline and intuitively display internal structure information of the pipeline.

8 Claims, 5 Drawing Sheets

(51) Int. Cl.
*G06V 10/44* (2022.01)
*G06V 10/46* (2022.01)
*G06V 10/771* (2022.01)

(52) U.S. Cl.
CPC .. *G06V 10/771* (2022.01); *G06T 2207/20081* (2013.01)

(56) References Cited

OTHER PUBLICATIONS

Wu G, Zhang H, Yan Z, Wang H, Zhong Z, Yin Z. 3D pipeline reconstruction and diameter measurement method based on target segmentation. In International Conference on Algorithm, Imaging Processing, and Machine Vision (AIPMV 2023) Jan. 9, 2024 (vol. 12969, pp. 539-551). SPIE (Year: 2024).*

* cited by examiner

| A depth camera is calibrated using Zhang's calibration method by Zhang Zhengyou to obtain camera internal parameters, and monocular videos in different pipeline scenes are collected using a pipeline robot equipped with the depth camera | S1 |

| The COLMAP method is applied to perform feature extraction and matching and incremental reconstruction on a pipeline scene image sequence composed of each monocular video, so as to obtain camera external parameters corresponding to images in each pipeline scene image sequence. A pipeline three-dimensional reconstruction dataset is constructed according to the camera internal parameters, the camera external parameters corresponding to the images in each pipeline scene image sequence, the pipeline scene image sequence and a real depth map | S2 |

| The Fast-MVSNet network and the PatchMatchNet network are trained by using public datasets to obtain multiple trained Fast-MVSNet network models and multiple trained PatchMatchNet network models | S3 |

| The pipeline three-dimensional reconstruction dataset is input into all the trained Fast-MVSNet network models and all the trained PatchMatchNet network models, and all the trained network models are evaluated to obtain an optimal network model | S4 |

| The optimal network model is used to perform three-dimensional reconstruction and depth prediction on a pipeline three-dimensional reconstruction dataset to be processed | S5 |

MONOCULAR VIDEO-BASED THREE-DIMENSIONAL RECONSTRUCTION AND DEPTH PREDICTION METHOD AND SYSTEM FOR PIPELINE

CROSS-REFERENCE TO RELATED APPLICATION

This patent application claims the benefit and priority of Chinese Patent Application No. 2024101294468 filed with the China National Intellectual Property Administration on Jan. 31, 2024, the disclosure of which is incorporated by reference herein in its entirety as part of the present application.

TECHNICAL FIELD

The present disclosure relates to the technical field of deep learning and image processing, and in particular to a monocular video-based three-dimensional reconstruction and depth prediction method and system for a drainage pipeline.

BACKGROUND

Urban underground drainage pipeline is relatively special due to its complex internal environment and unique geographical location, which is the high frequency point of accident outbreak. In the urban drainage pipeline, the internal inspection for the pipeline is mainly based on internal videos of the pipeline obtained by a pipeline robot. However, many cities are stuck in two-dimensional management mode for such video data, leading to the difficulty in grasping the overall situation and detailed characteristics of the pipeline, the lack of accurate positioning information of disease detection results, inability to adapt to today's increasingly complex pipeline network, the disadvantages such as low data utilization rate and poor visualization effect, and the difficulty to keep up with the pace of urban modernization, informationization and intelligent development. Therefore, three-dimensional reconstruction of the collected monocular video is of a great significance for pipeline management and maintenance.

The core idea of three-dimensional reconstruction is to restore a three-dimensional structure of an original scene from 2D images acquired by the robot. At present, most of the three-dimensional reconstruction methods are based on outdoor large buildings or small objects, and there are few algorithms for three-dimensional reconstruction of pipeline environment. In the early days, Structure from Motion (SfM) was mainly used in the traditional monocular vision-based three-dimensional reconstruction methods. However, due to the accumulation of errors caused by the continuous participation of images in the reconstruction process, the three-dimensional reconstruction is prone to drift. In addition, the selection of initial image pair and the quality of the image will seriously interfere with the results of three-dimensional reconstruction, leading to low efficiency, sparse 3D point cloud, and difficulty in reconstructing the low-textured areas of the pipeline. In recent years, the research based on deep learning methods has also shown an upward trend, and the general network architecture (for example, MVSNet) is mainly adopted in these methods. Although the integrity and accuracy of reconstruction of these methods are better than the traditional methods, the dependence on a large amount of video memory and memory leads to high requirements on the hardware devices. However, the urban underground pipelines have the features such as repeated texture and slight texture and are in a no-light or weak-light environment, so the details of the collected video images are blurred, which makes these algorithms not effective in the three-dimensional reconstruction of the drainage pipeline scene, and the practical application of the pipeline three-dimensional reconstruction and depth prediction is difficult.

SUMMARY

An objective of the present disclosure is to provide a monocular video-based three-dimensional reconstruction and depth prediction method and system for a pipeline, which can greatly improve the accuracy of three-dimensional reconstruction and depth prediction of the pipeline.

To achieve the objective above, the present disclosure employs the following technical solution.

In a first aspect, a monocular video-based three-dimensional reconstruction and depth prediction method for a pipeline is provided, including:

calibrating a depth camera using Zhang's calibration method to obtain camera internal parameters, and collecting monocular videos in different pipeline scenes using a pipeline robot equipped with the depth camera;

applying the COLMAP method to perform feature extraction and matching and incremental reconstruction on a pipeline scene image sequence composed of each monocular video to obtain camera external parameters corresponding to images in each pipeline scene image sequence, and constructing a pipeline three-dimensional reconstruction dataset according to the camera internal parameters, the camera external parameters corresponding to the images in each pipeline scene image sequence, the pipeline scene image sequence and a corresponding real depth map;

training the Fast-MVSNet network and the PatchMatchNet network respectively using the public datasets to obtain multiple trained Fast-MVSNet network models and multiple trained PatchMatchNet network models, where the public datasets comprise the DTU dataset, the BlendedMVS dataset, and the ETH3D dataset;

inputting the pipeline three-dimensional reconstruction dataset into all the trained Fast-MVSNet network models and all the trained PatchMatchNet network models, respectively, and evaluating all the trained network models to obtain an optimal network model, where the trained network models comprise all the trained Fast-MVSNet network models and all the trained PatchMatchNet network models; and performing three-dimensional reconstruction and depth prediction on a pipeline three-dimensional reconstruction dataset to be processed using the optimal network model.

In a second aspect, a system for three-dimensional reconstruction and depth prediction of a monocular video of a pipeline is provided, including:

a video collection module, configured to calibrate a depth camera using Zhang's calibration method to obtain camera internal parameters, and to collect monocular videos in different pipeline scenes using a pipeline robot equipped with the depth camera;

a pipeline three-dimensional reconstruction dataset construction module, configured to perform feature extraction and matching and incremental reconstruction on a pipeline scene image sequence composed of each monocular video by using the COLMAP method, so as to obtain camera external parameters corresponding to images in each pipeline scene image sequence, and to construct a pipeline three-dimensional reconstruction dataset according to the camera internal parameters, the camera external parameters corresponding to the images in each pipeline scene image sequence, the pipeline scene image sequence and a corresponding real depth map;

a network training module, configured to train the Fast-MVSNet network and the PatchMatchNet network respectively using the public datasets to obtain a plurality of trained Fast-MVSNet network models and a plurality of trained PatchMatchNet network models, where the public datasets comprise the DTU dataset, the BlendedMVS dataset, and the ETH3D dataset;

a network testing and screening model, configured to input the pipeline three-dimensional reconstruction dataset into all the trained Fast-MVSNet network models and all the trained PatchMatchNet network models, respectively, and to evaluate all the trained network models to obtain an optimal network model, where the trained network models comprise all the trained Fast-MVSNet network models and all the trained PatchMatchNet network models; and a three-dimensional reconstruction and depth prediction module, configured to perform three-dimensional reconstruction and depth prediction on a pipeline three-dimensional reconstruction dataset to be processed by using the optimal network model.

According to specific embodiments of the present disclosure, the present disclosure has the following technical effects.

A monocular video-based three-dimensional reconstruction and depth prediction method and system for a pipeline are provided by the present disclosure. A monocular video in an experimental pipeline scene is acquired using a depth camera, and a pipeline three-dimensional reconstruction dataset is constructed. The Fast-MVSNet network and the PatchMatchNet network are respectively trained using the public datasets to obtain multiple trained network models. Afterwards, the pipeline three-dimensional reconstruction dataset is used as a test set to test each trained network model, thereby evaluating an optimal network model to be applied to actual pipeline three-dimensional reconstruction and depth prediction. The holistic framework from the monocular video to a three-dimensional scene is constructed, including the application of the COLMAP method, the application of the Fast-MVSNet network and PatchMatchNet network, which can effectively achieve the three-dimensional reconstruction and depth prediction of the drainage pipeline, intuitively display the internal structure information of the pipeline, and can be used in the engineering fields of real-time monitoring of drainage pipeline detection robots, underground pipeline disease detection and identification, regular maintenance and the like.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a monocular video-based three-dimensional reconstruction and depth prediction method and system for a pipeline. A holistic framework from a monocular video to a three-dimensional scene based on the Fast-MVSNet network and the PatchMatchNet network is constructed. Internal parameters of a monocular video acquired by a pipeline robot is obtained by calibrating, and are fixed parameters of the camera. Camera external parameters are estimated by COLMAP, and different images of different pipelines have different camera external parameters. The holistic framework of monocular video-based three-dimensional reconstruction includes COLMAP, the Fast-MVSNet network, and the PatchMatchNet network. The COLMAP is used to estimate the camera external parameters, and the Fast-MVSNet network and the PatchMatchNet network are used to predict a camera depth map. The holistic framework can complete the reconstruction of the pipeline three-dimensional scene through a series of image sequences when the camera external parameters are unknown. The optimal model improves the accuracy and integrity of depth prediction and three-dimensional point cloud while having high efficiency and low video memory requirements, and thus can obtain a denser pipeline three-dimensional point cloud scene.

In order to make the objectives, technical solutions and advantages of the present disclosure more clearly, the present disclosure is further described in detail below with reference to the embodiments.

Embodiment 1

Figure 1:
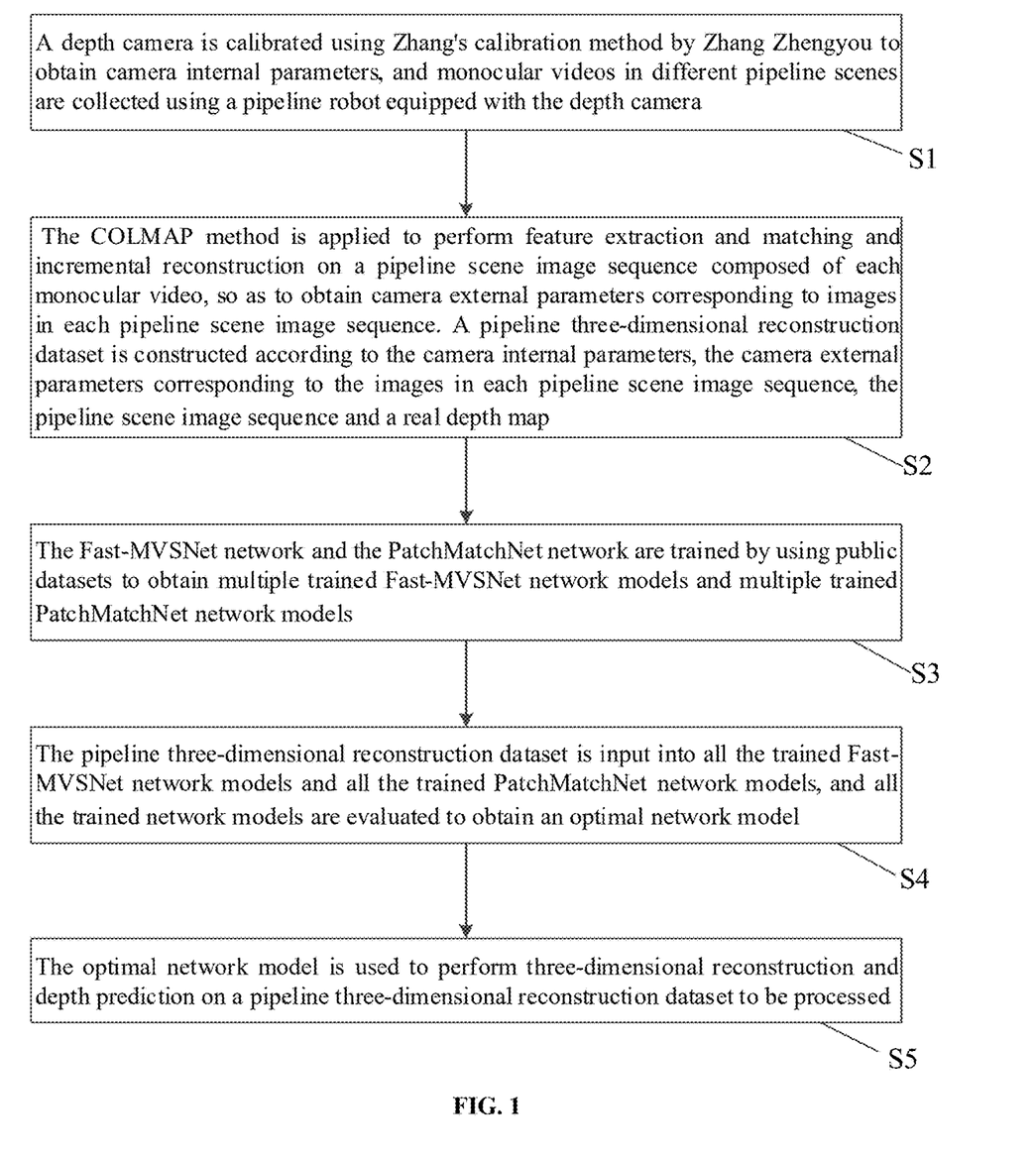
FIG. 1 is a flow chart of a monocular video-based three-dimensional reconstruction and depth prediction method for a pipeline according to Embodiment 1 of the present disclosure.

A monocular video-based three-dimensional reconstruction and depth prediction method for a pipeline is shown in FIG. 1, including the following steps.

In Step S1. A depth camera is calibrated using Zhang's calibration method by Zhang Zhengyou to obtain camera internal parameters, and monocular videos in different pipeline scenes are collected using a pipeline robot equipped with the depth camera.

The depth camera provided by the present disclosure is in a pinhole imaging model, there is a linear relationship between an image coordinate point and a spatial coordinate point of an object, and the transformation from a single two-dimensional image point to a three-dimensional spatial point depends on the solution of the camera internal and external parameters, with an expression as follows:

$$Z \begin{bmatrix} u \\ v \\ 1 \end{bmatrix} = M_1 [R, T] \begin{bmatrix} X_w \\ Y_w \\ Z_w \\ 1 \end{bmatrix}. \quad (1)$$

In the expression (1), ($X_w$, $Y_w$, $Z_w$) denotes the coordinates of an object in a world coordinate system; a parameter Z denotes Z-axis coordinates in a corresponding camera coordinate system; (u, v) denotes the coordinates in a corresponding pixel coordinate system projected on a two-dimensional image, and parameters $M_1$ and [R, T] are an internal parameter matrix and an external parameter matrix of the camera, respectively.

A 12×8 black and white checkerboard calibration board is manufactured, and 15 images of the calibration board are photographed with a depth camera at different angles. The depth camera is calibrated according to the Zhang's calibration method to obtain the internal parameter matrix $M_1$ and a distortion parameter β, with expressions respectively as follows:

$$M_1 = \begin{bmatrix} f_x & 0 & c_x & 0 \\ 0 & f_y & c_y & 0 \\ 0 & 0 & 1 & 0 \end{bmatrix} \quad (2)$$

$$\beta = (k_1, k_2, p_1, p_2, k_3). \quad (3)$$

In the expression (2) and expression (3), parameters $f_x$ and $f_y$ are focal lengths of the camera in x and y directions, ($c_x$, $c_y$) is an optical center of an image, and parameters $k_1$, $k_2$ and $k_3$ are radial distortion parameters, and parameters $p_1$ and $p_2$ are tangential distortion parameters.

In Step S2. The COLMAP method is applied to perform feature extraction and matching and incremental reconstruction on a pipeline scene image sequence composed of each monocular video, so as to obtain camera external parameters corresponding to images in each pipeline scene image sequence. A pipeline three-dimensional reconstruction dataset is constructed according to the camera internal parameters, the camera external parameters corresponding to the images in each pipeline scene image sequence, the pipeline scene image sequence and a real depth map.

Figure 2:
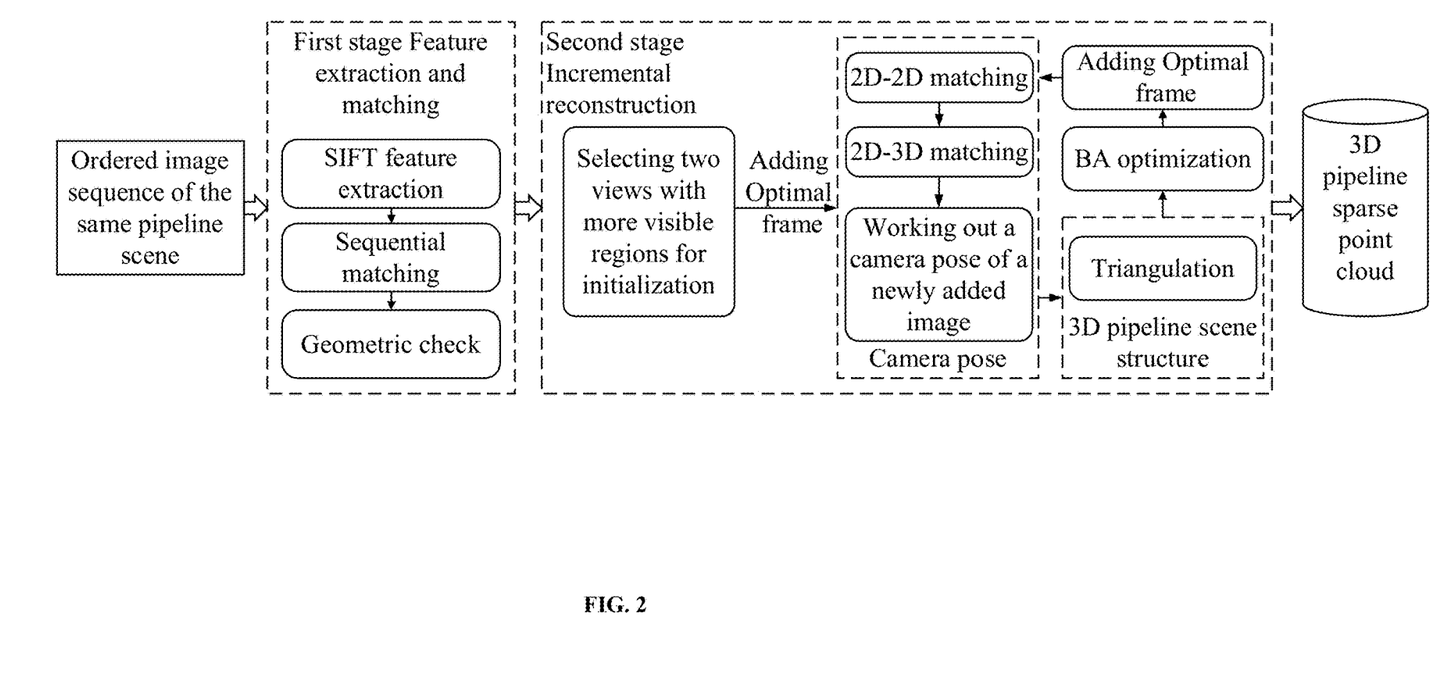
FIG. 2 is a flow chart of COLMAP algorithm according to Embodiment 1 of the present disclosure.

FIG. 2 is a flow chart of COLMAP algorithm according to the present disclosure, belonging to some embodiments of the present disclosure. The flow chart includes two stages, i.e., feature extraction and matching, and incremental reconstruction.

Continuous input images of the same pipeline scene image sequence are subjected to Scale Invariant Feature Transform (SIFT) feature extraction and feature matching, and feature correspondences of the image pair A and B is obtained by measuring the similarity using a feature set, so as to obtain a potential scene overlapping part. After the matching is completed, since there are usually multiple false matching point pairs, the matching point pairs in each matched image pair are refined using the epipolar geometry relationship, thus eliminating false matching.

All the images are sorted from large to small according to the number of matching points, and a first image is selected from images with most matching points. If the number of matching points between a second image and the first image is greater than 100 and a translation vector between the second image and the first image is greater than 0.95, these two images are selected as an initial image pair. In an image with unknown camera pose, an optimal frame is selected as a new image to be added to a three-dimensional pipeline scene according to the number of two-dimensional points in the image and 3D points in a constructed three-dimensional scene and a distribution of the two-dimensional points in the image and 3D points in a constructed three-dimensional scene on the image. A 2D-3D matching between the newly added image and an image in the constructed 3D pipeline scene model is obtained by performing 2D-2D relative orientation on the newly added image and an image in the constructed 3D pipeline scene model, and thus the camera pose of the newly-added image can be calculated using Random Sample Consensus (RANSAC)-Perspective-n-Point (PnP), and new three-dimensional points can be generated in the map through triangulation. As the process of image registration and triangulation is relatively independent, the uncertainty of the camera pose (camera external parameters) may affect triangulated points. With the increase of the number of cameras, in order to eliminate a cumulative error, bundle adjustment (BA) optimization is performed after image registration and triangulation are completed, i.e., the reprojection error is minimized by adjusting the camera pose and the position of map points.

After the incremental reconstruction is completed, a pipeline test dataset is constructed, including a RGB image of each pipe in different image sequences, and corresponding depth map, cameral internal and external parameters, depth information, and optimal source view serial number. Quaternion Q($q_w$, $q_x$, $q_y$, $q_z$) and the translation vector T ($t_x$, $t_y$, $t_z$) of the camera in each visual angle are obtained, $q_w$ belongs to a real part and denotes a rotation angle, and $q_x$, $q_y$, $q_z$ belong to an imaginary part, and denote a direction of a rotation axis. The camera external parameters [R, T], and depth information of each image are obtained by an operation such as converting quaternion into a rotation matrix, where n represents a n-th image. An camera external parameter expression is as follows:

$$[R, T]_n = \begin{bmatrix} 1 - 2q_y^2 - 2q_z^2 & 2q_xq_y + 2q_wq_z & 2q_wq_z - 2q_wq_y & t_x \\ 2q_xq_y - 2q_wq_z & 1 - 2q_x^2 - 2q_z^2 & 2q_yq_z + 2q_wq_x & t_y \\ 2q_xq_z + 2q_wq_y & 2q_yq_z - 2q_wq_x & 1 - 2q_x^2 - 2q_y^2 & t_z \\ 0 & 0 & 0 & 1 \end{bmatrix}. \quad (4)$$

Considering the continuity of the pipeline image sequence and the small change of the angles of adjacent frames, 10 optimal source views are selected for each two-dimensional image in the image sequence according to a number of frames, that is, the closer to the adjacent frames of the two-dimensional reference image is, the higher the score is.

Therefore, as some embodiments of the present disclosure, Step S2 specifically includes the following steps.

In Step S21: Scale Invariant Feature Transform (SIFT) feature extraction and feature matching are performed on each pipeline scene image sequence, and false matching point pairs in each matched image pair are eliminated using an epipolar geometry relationship.

In Step S22: all images are sorted according to the number of matching points for each pipeline scene image sequence, with an image with the largest number of matching points as a starting point, and two images with the number of matching point pairs between the two images greater than a first predetermined value and a translation vector between the two images greater than a second predetermined value as an initial image pair; and camera external parameters of a first image in the initial image pair are set as an identity matrix.

In Step S23: camera external parameters of a second image in the initial image pair are calculated using the epipolar geometry relationship according to a 2D-2D matching relationship of the initial image pair and the identity matrix, where the 2D-2D matching relationship refers to a SIFT feature matching relationship obtained by Step S21.

In Step S24: the initial image pair are triangulated to generate initial pipeline scene three-dimensional points in the pipeline three-dimensional scene.

In Step S25: an optimal image is selected from currently unselected images as a current newly added image according to the number of points with a corresponding relationship between two-dimensional points in the image and currently constructed pipeline scene three-dimensional points and the distribution of the corresponding two-dimensional points in the images, where the currently constructed pipeline scene three-dimensional points include initial pipeline scene three-dimensional points and all currently optimized three-dimensional points, and the corresponding two-dimensional points refer to two-dimensional points, which have the corresponding relationship with the currently constructed pipeline scene three-dimensional points, in the image.

In Step S26: a 2D-3D matching relationship between the current newly added image and each target image are obtained according to a 2D-2D matching relationship between the current newly added image and currently selected images, and camera external parameters of the current newly added image are calculated using a RANSAC-PnP method according to the 2D-3D matching relationship and the camera internal parameters, where the target image is an image having the 2D-2D matching relationship with the current newly added image among the currently selected images;

In Step S27: the current newly added image and the target image are triangulated to generate a newly added pipeline scene three-dimensional point in the pipeline three-dimensional scene; and BA optimization is performed on the camera external parameters of the currently selected images and the currently constructed pipeline scene three-dimensional points to obtain optimized three-dimensional points and optimized camera external parameters corresponding to the currently selected images.

In Step S28: Step S25 "an optimal image is selected from currently unselected images as a current newly added image according to the number of points with a corresponding relationship between two-dimensional points in the image and currently constructed pipeline scene three-dimensional points and the distribution of the corresponding two-dimensional points in the images" is returned to be executed until a newly added image is unable to be selected.

In Step S29: the pipeline three-dimensional reconstruction dataset is constructed using the initial image pair and all the newly added images, where the pipeline three-dimensional reconstruction dataset comprises all selected images, and a real depth map, camera internal and external parameters, depth information of each pixel point and optimal source view serial number corresponding to each selected image; the selected images comprise the initial image pair and all the newly added images; the real depth map corresponding to each selected image is obtained using the depth camera; the optimal source view serial number corresponding to each selected image is frame serial number of a plurality of images closest to frame serial number of the selected image.

In Step S3. The Fast-MVSNet network and the PatchMatchNet network are trained by using public datasets to obtain multiple trained Fast-MVSNet network models and multiple trained PatchMatchNet network models. The public datasets include the DTU dataset, the BlendedMVS dataset, and the ETH3D dataset.

In Step S3, the training of the Fast-MVSNet network and the training of the PatchMatchNet network are included.

The same view selection strategy as MVSNet is used, the number of the source views is set to 5, and the datasets used in the training process are all public datasets, including the DTU dataset, the BlendedMVS dataset and the ETH3D dataset. In the DTU dataset, 79 groups are selected as a training set, and 18 groups are used as a validation set for training, the size of an input sample is fixed to be H×W×D=512×640×48, and the depth range is [425,935]. H, W and D are height, width, and the number of depth planes of a dataset image, respectively. In the BlendedMVS dataset, there are 106 groups of training scenes and 7 groups of validation scenes. As the depth range in the dataset is not an absolute distance in millimeters, but belongs to some unknown units, it is difficult to evaluate the absolute accuracy. Therefore, when the size of the input sample is fixed to be H×W×D=512×640×48, the depth range is approximately between 100 and 1000, and other coefficients are correspondingly corrected. The ETH3D dataset is divided into a validation set and a training set, and images and depth maps are further cut to H×W×D=448×896×48. As the ETH3D dataset includes only three depth parameters, the maximum depth $D_{MAX}$ is calculated through an expression (5), and camera parameters are corrected.

$$D_{MAX}=D_{MIN}+D_{INTERVAL}\times(\max_d-1) \quad (5)$$

In the expression (5), $D_{MIN}$, $D_{INTERVAL}$ and $\max_d$ denote a minimum depth, a depth interval and the number of depth planes, respectively.

Figure 3:
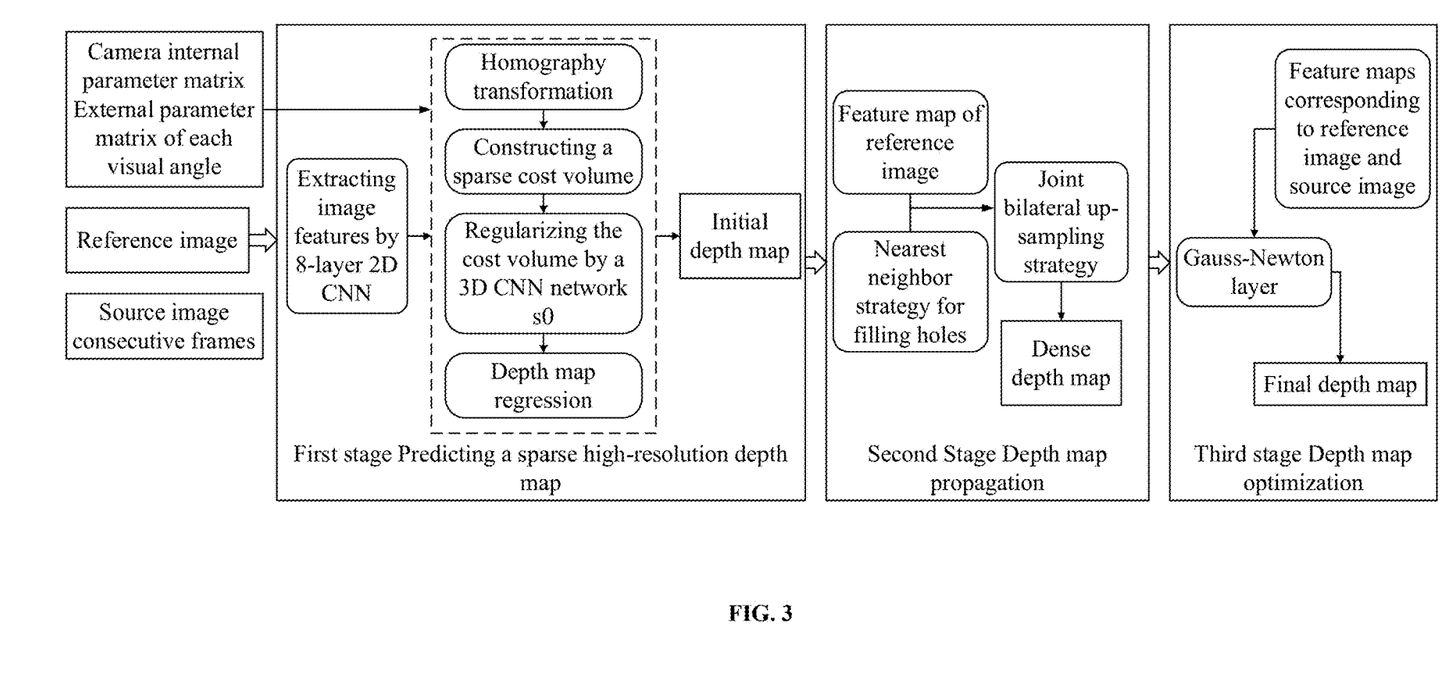
FIG. 3 is a flow chart of Fast-MVSNet algorithm according to Embodiment 1 of the present disclosure.

FIG. 3 is a flow chart of Fast-MVSNet algorithm according to the present disclosure, belonging to some embodiments. The MVSNet is used as a basis network, and a framework from sparse to dense and from coarse to fine is adopted, which is divided into three parts: predicting a sparse but high-resolution depth map, propagating a depth map, and optimizing a depth map.

In the Fast-MVSNet network, two modules of predicting the sparse depth map and propagating the depth map are subjected to four rounds of pre-training, and then the whole model is subjected to end-to-end training until a loss function converges. For each input reference image $J_{ref}$ and five corresponding source images $\{J_i\}_{i=1}^5$ with the highest scores thereof, 8-layer 2D CNN is used to extract image features $F_{ref}$ and $\{J_i\}_{i=1}^5$ of 32 channels, and a ⅛ W×⅛ H×D×F sparse cost volume is constructed based on the obtained feature map and camera internal and external parameters in a spatial domain. W and H are the width and height of the input image, respectively, fewer number of depth planes D=48 is used, and F is the number of the feature channels. The sparse cost volume is regularized by a multi-scale 3D CNN, and the depth map regression is performed by differentiable argmax, thus acquiring a sparse depth map $P_s$ at a lower cost. The sparse depth map $P_s$ fills the holes by the nearest neighbor strategy, a 10-layer convolutional network is configured to extract features from the reference map $J_{ref}$ to predict a weight α of each pixel point, and a joint bilateral up-sampling is selected to achieve the densification $P_d$ of an initial sparse depth map, with an expression shown as follows:

$$P_d = \frac{1}{\beta_d} \sum p_i \alpha_d. \tag{6}$$

In expression (6), $\beta_d$, $p_i$ and $\alpha_d$ are a normalized term, a neighborhood pixel point of the pixel point $p_d$, and a weight of the pixel point $p_d$.

A network structure similar to the depth map propagation is used to extract deep feature representation of the reference map $J_{ref}$ and the source view $\{J_i\}_{i=1}^5$. A Gauss-Newton layer is iterated twice, that is, the iteration is performed on the depth maps with ¼ and ½ original image size, so as to improve the accuracy of the depth map and obtain the final depth map.

Therefore, training the Fast-MVSNet network is as follows: training the Fast-MVSNet network using the public datasets to obtain multiple trained Fast-MVSNet network models, which is specifically as follows.

In Step S311: training sample datasets are determined from the DTU dataset, the BlendedMVS dataset and the ETH3D dataset, where the training sample datasets comprise the DTU sample dataset, the BlendedMVS sample dataset and the ETH3D sample dataset.

In Step S312: the Fast-MVSNet network is trained using the DTU sample dataset, the BlendedMVS sample dataset and the ETH3D sample dataset to obtain three trained Fast-MVSNet network models.

Therefore, as some embodiments, Step S312 specifically includes the following steps.

In Step S3121: image features are extracted from each reference image in each training sample dataset and all corresponding source images by using a 2D convolutional network, so as to obtain a first reference feature map corresponding to each reference image and a first source feature map corresponding to each source image.

In Step S3122: a sparse cost volume is constructed for each first reference feature map according to the first reference feature map, each corresponding source feature map and corresponding camera internal and external parameters, the sparse cost volume is regularized through a 3D convolutional network, and depth map regression is performed on a regularized result through differentiable argmax to obtain an initial depth map corresponding to each reference image.

In Step S3123: a nearest neighbor strategy is applied to each initial depth map to fill holes, thus obtaining a filled depth map.

In Step S3124: a joint bilateral up-sampling strategy is applied to each filled depth map and a corresponding second reference feature map which is obtained by passing the reference image through a first convolutional network, so as to obtain a dense depth map corresponding to each reference image.

In Step S3125: the dense depth map, the corresponding camera internal and external parameters, the corresponding reference image and the corresponding source image are processed by using a Gauss-Newton layer, so as to obtain an optimized depth map corresponding to each reference image.

The Fast-MVSNet network is subjected to multiple rounds of training from Step S311 to S3125 until a loss function converges, and thus the training of the Fast-MVS-Net network is completed, and three trained Fast-MVSNet network models are obtained.

As some embodiments, the Step S3125 of "the dense depth map, the corresponding camera internal and external parameters, the corresponding reference image and the corresponding source image are processed by using a Gauss-Newton layer, so as to obtain an optimized depth map corresponding to each reference image" specifically includes the following steps.

(1) for each reference image, the reference image with ¼ original size and the corresponding source image with ¼ original size are passed through a second convolutional network to obtain a third reference feature map and a corresponding second source feature map.

(2) the third reference feature map, the corresponding second source feature map, the corresponding dense depth map and the corresponding camera internal and external parameters are processed by using the Gauss-Newton layer to obtain a first incremental result, and a primary iteration depth map is obtained according to the first incremental result and the dense depth map.

(3) the reference image with ½ original size and the corresponding source image with ½ original size are passed through the second convolutional network to obtain a fourth reference feature map and a corresponding third source feature map.

(4) the fourth reference feature map, the corresponding third source feature map, the primary iteration depth map and the corresponding camera internal and external parameters are processed by using the Gauss-Newton layer to obtain a second incremental result, and a secondary iteration depth map is obtained according to the second incremental result and the primary iteration depth map, namely, the optimized depth map.

Figure 4:
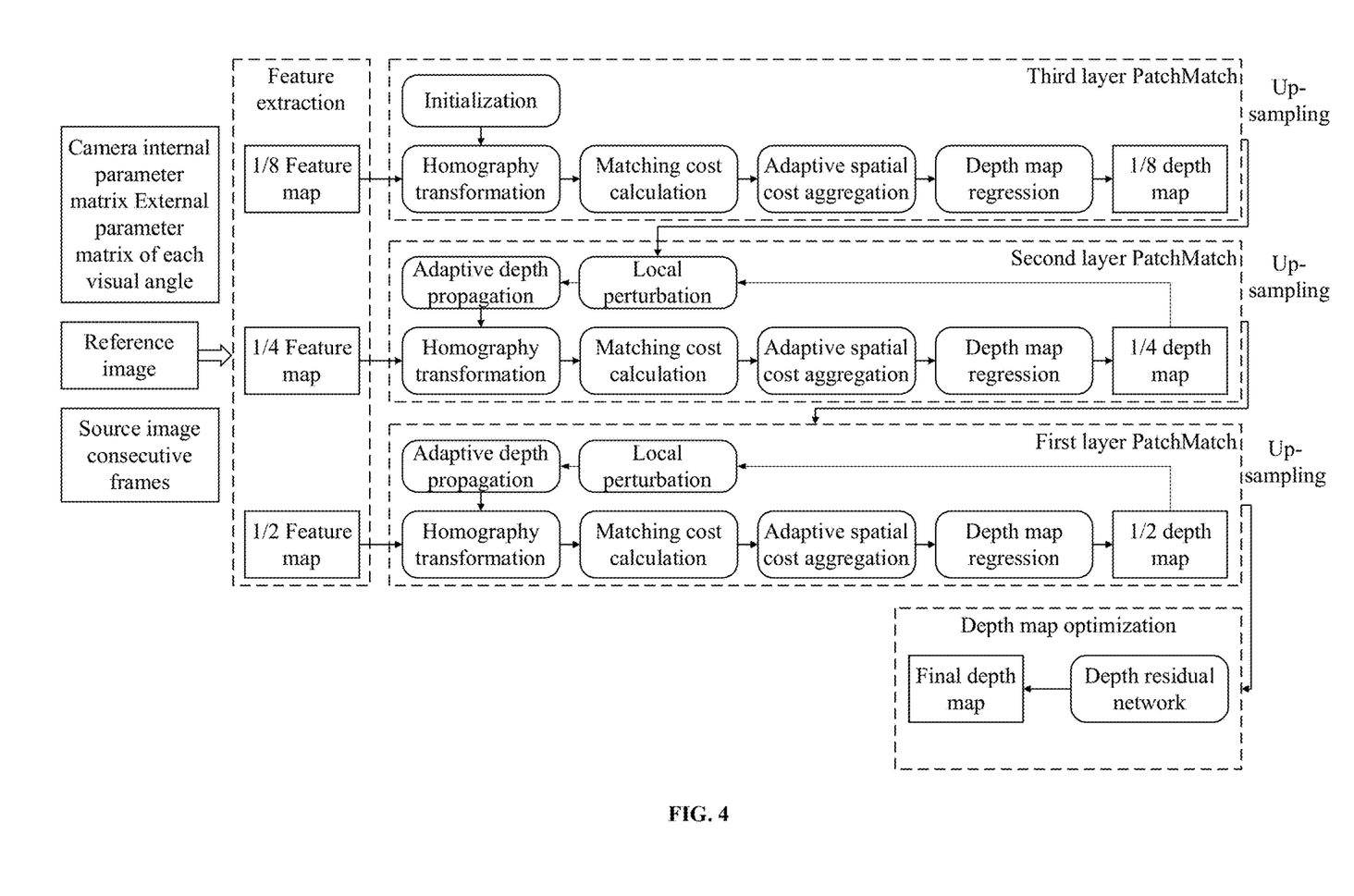
FIG. 4 is a flow chart of PatchMatchNet algorithm according to Embodiment 1 of the present disclosure.

Therefore, the training of the PatchMatchNet network includes: training the PatchMatchNet network using the public datasets to obtain multiple trained PatchMatchNet network models, which is specifically as follows.

In Step S321: the PatchMatchNet network is trained using the DTU sample dataset, the BlendedMVS sample dataset and the ETH3D sample dataset to obtain three trained PatchMatchNet network models.

FIG. 4 is a flow chart of PatchMatchNet algorithm according to the present disclosure, belonging to some embodiments. The flow chart includes three parts: feature extraction, PatchMatch module, and depth map optimization.

In the PatchMatchNet algorithm, the features of each reference image $J_{ref}$ and the corresponding source image $\{J_i\}_{i=1}^5$ are extracted using a feature pyramid, so as to obtain feature maps $F_{ref}$ and $\{F_i\}_{i=1}^5$ with ⅛, ¼ and ½ original size. In the process from a third layer of PatchMatch module to a first layer of PatchMatch module, the depth map is refined step by step from low resolution to high resolution. The number of iterations of each layer of PatchMatch module is (1, 2, 2), and $m_p$ depth hypothesis values are initialized for each pixel point p in the reference map $J_{ref}$ within a predetermined depth range $[d_{min}, d_{max}]$. The scale of depth interval and the number of depth samples in each layer are (0.005, 0.0125, 0.025) and (8, 8, 16), respectively. Based on the obtained feature maps and the camera internal and external parameters, a position of the pixel point p in each source image is obtained, and matching cost is calculated for each depth assumption value in the pixel point p. Adaptive spatial cost aggregation is performed with the idea of adaptive propagation, and the number of neighborhoods is (9, 9, 9), and then aggregated spatial cost is obtained. The cost volume is transformed into probability using softmax activation function, and an initial depth map is obtained by a weighted sum. The depth map, after being subjected to up-sampling and local perturbation, is used as an initial depth value of the next layer, and adaptive depth propagation is only performed in the first layer and the second layer of modules. The number of neighborhoods used and dilation parameters propagated in 2D convolution are (0, 8, 16) and (6, 4, 2), respectively, and a depth map $P_1$ with the size of W/2× H/2 is ultimately obtained. The initial depth image $P_1$ is normalized and pre-scaled to the range of [0:1], the initial depth image $P_1$ is up-sampled and refined through a depth residual network, and the depth map is reduced to an original depth range, so as to obtain the final depth map $\check{P}$.

Therefore, as some embodiments, Step S321 specifically includes the following steps.

In Step (a): image features are extracted for each reference image in each training sample dataset and all corresponding source images by using a feature pyramid to obtain a reference feature map with ⅛ original size, a reference feature map with ¼ original size and a reference feature map with ½ original size corresponding to each reference image, and a source feature map with ⅛ original size, a source feature map with ¼ original size and a source feature map with ½ original size corresponding to each source image.

In Step (b): for each reference image, multiple depth hypothesis values are set for each pixel point in each reference image within the predetermined depth range, so as to obtain a depth initialization result of each reference image.

In Step (c): homography transformation is executed on each reference image according to the reference feature map with ⅛ original size, the source feature map with ⅛ original size, the depth initialization result and the corresponding camera internal and external parameters, so as to obtain a first homography transformation result.

In Step (d): for each reference image, matching cost calculation is executed on each depth hypothesis value of each pixel point in the reference image according to the first homography transformation result, the reference feature map with ⅛ original size and the source feature map with ⅛ original size, so as to obtain a first matching cost calculation result.

In Step (e): adaptive spatial cost aggregation is executed according to the first matching cost calculation result to obtain a first cost aggregation result, and depth map regression is executed on the first cost aggregation result to obtain a depth map with ⅛ original size corresponding to each reference image.

In Step (f): the depth map with ⅛ original size of each reference image is up-sampled to obtain a first up-sampled depth map, local perturbation is executed on the first up-sampled depth map to obtain a first local perturbation result, and adaptive depth propagation is executed on the first local perturbation result to obtain a first adaptive depth propagation result.

In Step (g): homography transformation is executed according to the first adaptive depth propagation result, the reference feature map with ¼ original size, the source feature map with ¼ original size and the corresponding camera internal and external parameters, so as to obtain a second homography transformation result.

In Step (h): matching cost calculation is executed on each depth hypothesis value of each pixel point in the reference image according to the second homography transformation result, the reference feature map with ¼ original size and the source feature map with ¼ original size, so as to obtain a second matching cost calculation result.

In Step (i): adaptive spatial cost aggregation is executed according to the second matching cost calculation result to obtain a second cost aggregation result, and depth map regression is executed on the second cost aggregation result to obtain a depth map with ¼ original size corresponding to each reference image.

In Step (j): the first up-sampled depth map is replaced with the current depth map with ¼ original size, and Step (f) of "executing local perturbation on the first up-sampled depth map to obtain a first local perturbation result and executing adaptive depth propagation on the first local perturbation result to obtain a first adaptive depth propagation result" is returned to be executed until the number of return iterations reaches the first predetermined number of iterations.

In Step (k): the depth map with ¼ original size obtained by the last iteration is up-sampled to obtain a second up-sampled depth map, local perturbation is executed on the second up-sampled depth map to obtain a second local perturbation result, and adaptive depth propagation is executed on the second local perturbation result to obtain a second adaptive depth propagation result.

In Step (l): homography transformation is executed according to the second adaptive depth propagation result, the reference feature map with ½ original size, the source feature map with ½ original size and the corresponding camera internal and external parameters, so as to obtain a third homography transformation result.

In Step (m): matching cost calculation is executed on each depth hypothesis value of each pixel point in the reference image according to the third homography transformation result, the reference feature map with ½ original size and the source feature map with ½ original size to obtain a third matching cost calculation result.

In Step (n): adaptive spatial cost aggregation is executed according to the third matching cost calculation result to obtain a third cost aggregation result, and depth map regression is executed on the third cost aggregation result to obtain a depth map with ½ original size corresponding to each reference image.

In Step (o): the second up-sampled depth map is replaced with the current depth map with ½ original size, and Step (k) of "executing local perturbation on the second up-sampled depth map to obtain a second local perturbation result and executing adaptive depth propagation on the second local perturbation result to obtain a second adaptive depth propagation result" is returned to be executed until the number of return iterations reaches the second predetermined number of iterations.

In Step (p): the depth map with ½ original size obtained by the last iteration is passed through a deep residual network for upsampling and refinement to obtain the final depth map.

The PatchMatchNet network is subjected to multiple rounds of training from Step (a) to Step (p) until a loss function converges, and thus the training of the PatchMatchNet network is ended, and three trained PatchMatchNet network models are obtained.

In Step S4. The pipeline three-dimensional reconstruction dataset is input into all the trained Fast-MVSNet network models and all the trained PatchMatchNet network models, and all the trained network models are evaluated to obtain an optimal network model. The trained network models include all the trained Fast-MVSNet network models, and all the trained PatchMatchNet network models.

The trained three-dimensional reconstruction network model (trained network model) is configured to predict a depth map and a confidence map of a self-constructed pipeline test dataset, and the depth map is projected into a three-dimensional space to obtain final point cloud. Simultaneously, a method for outlier filtering and depth map fusion is adopted, and abnormal values in the depth map are screened by geometric consistency and photometric consistency to suppress noise generated in the process of three-dimensional point cloud fusion.

The depth prediction accuracy of the pixel point is measured by means of photometric consistency. Compared with a phenomenon that the probability distribution of correctly matched pixel points is concentrated in one peak, the probability distribution of false pixel points is relatively scattered. Based on this, the confidence of each pixel point is calculated by the probability sum of four neighborhood depth estimations, and the quality of the depth estimation is measured by means of the confidence map. If the confidence of the pixel point is high, it is considered that the depth estimation of the pixel is accurate. Therefore, in the confidence map obtained by means of the network model, a point with a probability value lower than a photometric consistency threshold is considered as an outlier point.

Simultaneously, the depth continuity between multiple views is measured by means of geometric consistency. By means of the camera internal and external parameter transformation, a depth value $d_{ref}$ at a pixel point $n_{ref}$ of the reference map is projected to $n_i$ in a neighborhood view, and then a depth value $d_i$ at $n_i$ is re-projected to a reference map $n_{ref}$, a depth value of which is $d'_{ref}$. If the following equations (7) and (8) are satisfied, by controlling the geometric consistency threshold v, a depth prediction value $d_{ref}$ at the pixel point $n_{ref}$ is guaranteed to be consistent on at least v views. In addition, a mean value of the depth value $d_{ref}$ and the depth value $d_i$ is used as a final depth value of the pixel point $n_{ref}$. The equations (7) and (8) are as follows:

$$|n'_{ref} - n_{ref}| < 1 \tag{7}$$

$$|d'_{ref} - d_{ref}| \div d_{ref} < 0.01 \tag{8}$$

Figure 5:
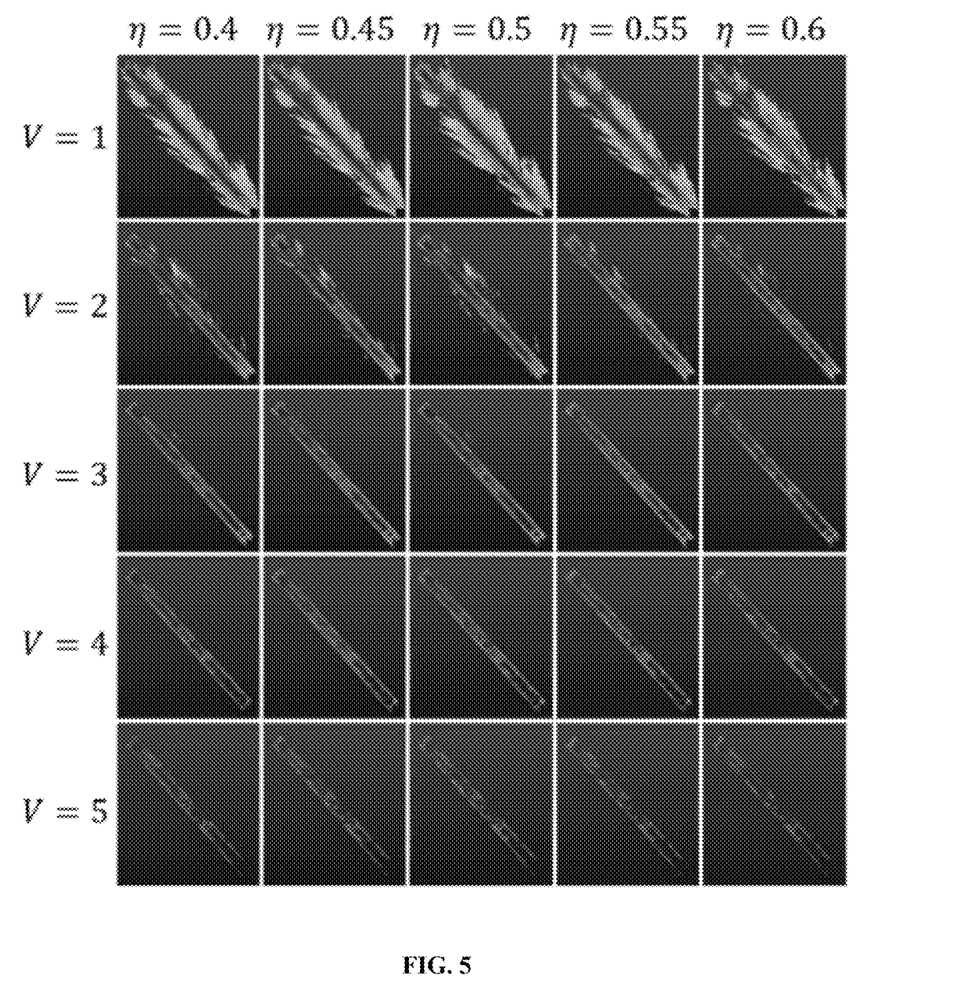
FIG. 5 is a picture showing an effect of outlier filtering according to Embodiment 1 of the present disclosure.

A visual effect diagram of point cloud is shown in FIG. 5, and different types of outlier points can be filtered by adjusting related threshold parameters. With the increase of geometric consistency threshold η and photometric consistency threshold V, the requirements for depth prediction value are more and more demanding, the reconstruction noise is effectively suppressed, and the accuracy of point cloud results in the three-dimensional space is also improved, but at the same time, the integrity is reduced accordingly. In order to balance the relationship between integrity and accuracy of the point cloud, η=0.55 and V=3 are selected as the thresholds of the photometric consistency and the geometric consistency.

The self-constructed pipeline test dataset (i.e., pipeline three-dimensional reconstruction dataset) is used to verify the effect of the holistic framework, achieve three-dimensional point cloud reconstruction of a pipeline video, and perform an objective evaluation.

The effect of the holistic frame is verified using the pipeline three-dimensional reconstruction datasets, and the pipeline depth maps predicted by different network models are objectively evaluated. The objective quality evaluation criteria adopted are: mean absolute error and absolute relative error of each group of pipelines, as shown in Table 1. The reconstructed pipeline three-dimensional point clouds are evaluated objectively, and the objective quality evaluation criteria adopted are: the mean number of reconstructed 3D point clouds of each group of pipelines, as shown in Table 2.

TABLE 1

Table for objective evaluation of depth prediction accuracy

| | Fast-MVSNet | | PatchMatchNet | |
|---|---|---|---|---|
| | AbsRel | MAE/m | AbsRel | MAE/m |
| DTU | 0.4837 | 1.3803 | 0.2802 | 0.4241 |
| BlendedMVS | 0.4584 | 1.2205 | 0.4224 | 0.5586 |
| ETH3D | 0.4797 | 1.3925 | 0.5185 | 0.6479 |

TABLE 2

Table for objective evaluation of the number of 3D reconstructed point clouds

| | Fast-MVSNet The number of mean point clouds in each group/ $10^5$ | PatchMatchNet The number of mean point clouds in each group/ $10^5$ |
|---|---|---|
| DTU | 43.9 | 246.9 |
| BlendedMVS | 28.3 | 126.1 |
| ETH3D | 9.7 | 6.7 |

The mean absolute error (MAE) denotes a mean value of absolute differences between the predicted depth map and the real depth map. The smaller the value is, the smaller the mean deviation between the predicted depth value and the real depth value is, the higher the accuracy of depth prediction is, a computation equation is as follows:

$$MAE = \frac{1}{N}\sum_{n=1}^{N}|P_n^{\wedge} - P_n|. \tag{9}$$

In the equation (9), N is a number of samples of a test set, $P_n^{\wedge}$ denotes a predicted depth map of a certain frame of the pipeline, and $P_n$ denotes a real depth map.

The absolute relative error (AbsRel) denotes a mean value of a ratio of the absolute difference between the predicted depth value and the real depth value to the real depth, which is a measure of the accuracy of the predicted value, with a computation equation as follows:

$$MAE = \frac{1}{N}\sum_{n=1}^{N}\frac{|P_n^{\wedge} - P_n|}{P_n}. \tag{10}$$

The data in Table 1 and Table 2 show that the optimal model is a network model trained by the PatchMatchNet network on the DTU dataset. In the process of the fusion of the pipeline depth prediction map and the three-dimensional point clouds, the integrity and accuracy are excellent, and the pipeline scene can be restored to the maximum extent with less video memory.

Therefore, in some embodiments, Step S4 specifically includes the following steps.

In Step S41: the pipeline three-dimensional reconstruction dataset is used as a test dataset, and each trained network model is tested using the test dataset to obtain a predicted depth map and a confidence map for each pipeline scene output by each trained network model.

In Step S42: for each confidence map, a confidence value corresponding to each pixel point in the confidence map is compared with a confidence threshold to obtain a comparison result.

In Step S43: a depth prediction value $d_{ref}$ of each pixel point $n_{ref}$ in each reference image is projected to a corresponding pixel point $n_i$ of each source image by using the camera internal and external parameters, and a depth value $d_i$ at the pixel point $n_i$ is re-projected to a pixel point $n_{ref}$ of the reference image, where a corresponding depth value at the pixel point $n_{ref}$ is $d_{ref}$.

In Step S44: whether the depth prediction value $d_{ref}$ of each pixel point $n_{ref}$ in each reference image satisfies a pixel projection condition on at least v source images is determined to obtain a determination result, where the pixel projection condition is as follows:

$$|n'_{ref} - n_{ref}| < 1$$

and $$|d'_{ref} - d_{ref}| \div d_{ref} < 0.01.$$

In Step S45: for each predicted depth map, anomalous pixel points in the predicted depth map is screened out according to the comparison result and the determination result, and a mean value of the depth value $d_{ref}$ and the depth value $d_i$ is taken as a final depth value of the pixel point $n_{ref}$ through the compared pixel points.

In Step S46: the screened predicted depth map corresponding to each trained network model is projected to a three-dimensional space to obtain a three-dimensional reconstruction point cloud corresponding to each trained network model.

In Step S47: the optimal network model is determined according to a number of three-dimensional reconstruction point clouds corresponding to each trained network model, and a mean absolute error and/or absolute relative error between the predicted depth map and the real depth map.

In Step S5. The optimal network model is used to perform three-dimensional reconstruction and depth prediction on a pipeline three-dimensional reconstruction dataset to be processed.

In conclusion, the Zhang's calibration method, SfM and other technologies are adopted to obtain the internal and external parameters of the depth camera, the depth map and the confidence map of the pipeline are predicted based on the Fast-MVSNet and PatchMatchNet network structures, and the noise in the point cloud fusion reconstruction process is suppressed by using the photometric consistency and geometric consistency, the holistic framework for three-dimensional reconstruction from the monocular video to the pipeline point cloud is established, which is suitable for three-dimensional reconstruction and depth prediction of the monocular video of the drainage pipeline.

Embodiment 2

A monocular video-based three-dimensional reconstruction and depth prediction system for a pipeline is provided in this embodiment, including: a video collection module, a pipeline three-dimensional reconstruction dataset construction module, a network training module, a network testing and screening model, and a three-dimensional reconstruction and depth prediction module.

The video collection module is configured to calibrate a depth camera using Zhang's calibration method to obtain camera internal parameters, and to collect monocular videos in different pipeline scenes using a pipeline robot equipped with the depth camera.

The pipeline three-dimensional reconstruction dataset construction module is configured to perform feature extraction and matching and incremental reconstruction on a pipeline scene image sequence composed of each monocular video by using the COLMAP method, so as to obtain camera external parameters corresponding to images in each pipeline scene image sequence, and to construct a pipeline three-dimensional reconstruction dataset according to the camera internal parameters, the camera external parameters corresponding to the images in each pipeline scene image sequence, the pipeline scene image sequence and a corresponding real depth map.

The network training module is configured to train the Fast-MVSNet network and the PatchMatchNet network using the public datasets to obtain multiple trained Fast-MVSNet network models and multiple trained PatchMatchNet network models, where the public datasets comprise the DTU dataset, the BlendedMVS dataset, and the ETH3D dataset.

The network testing and screening model is configured to input the pipeline three-dimensional reconstruction dataset into all the trained Fast-MVSNet network models and all the trained PatchMatchNet network models, and to evaluate all the trained network models to obtain an optimal network model, where the trained network models comprise all the trained Fast-MVSNet network models and all the trained PatchMatchNet network models.

The three-dimensional reconstruction and depth prediction module is configured to perform three-dimensional reconstruction and depth prediction on a pipeline three-dimensional reconstruction dataset to be processed by using the optimal network model.

Embodiment 3

An electronic device provided by this embodiment includes a memory, and a processor. A computer program is stored in the memory, and the processor runs the computer program to cause an electronic device to execute a monocular video-based three-dimensional reconstruction and depth prediction method for a pipeline of Embodiment 1.

In some embodiments, the electronic device may be a server.

In addition, a non-transitory computer readable storage medium is further provided by this embodiment of the present disclosure. A computer program is stored on the non-transitory computer readable storage medium. The computer program, when executed by a processor, is used to achieve a monocular video-based three-dimensional reconstruction and depth prediction method for a pipeline of Embodiment 1.

The embodiments of the present disclosure may be provided as methods, systems, or computer program products. Therefore, the present disclosure can take the form of an entirely hardware embodiment, an entirely software embodiment, or an embodiment combining software and hardware aspects. Moreover, the present disclosure can take the form of a computer program product implemented on one or more computer-usable storage media (including but not limited to disk storage, CD-ROM, optical storage, etc.) containing computer-usable program codes.

The present disclosure is described with reference to flowcharts and/or block diagrams of methods, devices (systems), and computer program products according to embodiments of the present disclosure. It should be understood that each flow and/or block in the flowchart and/or block diagram, and combinations of the flow and/or block in the flowchart and/or block diagram can be implemented by computer program instructions. These computer program instructions may be provided to a processor of a general-purpose computer, a special-purpose computer, embedded processor or other programmable data processing devices to produce a machine, such that the instructions which are executed by the processor of the computer or other programmable data processing apparatus produce means for implementing the functions specified in the flowchart flow or flows and/or block or blocks in the block diagram.

These computer program instructions may also be stored in a computer-readable memory that can direct a computer or other programmable data processing devices to function in a particular manner, such that the instructions stored in the computer-readable memory produce an article of manufacture including instruction means that implement the functions specified in one or more flow charts and/or block diagrams.

These computer program instructions may also be loaded onto a computer or other programmable data processing apparatus, such that a series of operational steps are performed on the computer or other programmable devices to produce a computer-implemented process, such that the instructions executed on the computer or other programmable devices provide steps for implementing the functions specified in the flowchart flow or flows and/or block or blocks of the block diagram.

Various embodiments in this specification are described in a progressive way, and each embodiment focuses on the differences from other embodiments, so it is only necessary to refer to the same and similar parts between each embodiment. Since the system disclosed by the embodiments corresponds to the method disclosed by the embodiments, the description is relatively simple, and the reference is made to the descriptions in the method for related parts.

Specific examples are used herein for illustration of the principles and implementation methods of the present disclosure. The description of the embodiments is merely used to help illustrate the method and its core principles of the present disclosure. In addition, a person of ordinarily skilled in the art can make various modifications in terms of specific embodiments and scope of application in accordance with the teachings of the present disclosure. In conclusion, the content of this specification shall not be construed as a limitation to the present disclosure.

What is claimed is:

1. A monocular video-based three-dimensional reconstruction and depth prediction method for a pipeline, comprising:

calibrating a depth camera using Zhang's calibration method to obtain camera internal parameters, and collecting monocular videos in different pipeline scenes using a pipeline robot equipped with the depth camera;

applying a COLMAP method to perform feature extraction and matching and incremental reconstruction on a pipeline scene image sequence composed of each monocular video to obtain camera external parameters corresponding to images in each pipeline scene image sequence, and constructing a pipeline three-dimensional reconstruction dataset according to the camera internal parameters, the camera external parameters corresponding to the images in each pipeline scene image sequence, the pipeline scene image sequence and a corresponding real depth map;

training a Fast-MVSNet network and a PatchMatchNet network using public datasets to obtain a plurality of trained Fast-MVSNet network models and a plurality of trained PatchMatchNet network models, wherein the public datasets comprise a DTU dataset, a BlendedMVS dataset, and an ETH3D dataset;

inputting the pipeline three-dimensional reconstruction dataset into all the trained Fast-MVSNet network models and all the trained PatchMatchNet network models, and evaluating all the trained network models to obtain an optimal network model, wherein the trained network models comprise all the trained Fast-MVSNet network models and all the trained PatchMatchNet network models; and performing three-dimensional reconstruction and depth prediction on a pipeline three-dimensional reconstruction dataset to be processed using the optimal network model;

wherein the applying a COLMAP method to perform feature extraction and matching and incremental reconstruction on a pipeline scene image sequence composed of each monocular video to obtain camera external parameters corresponding to images in each pipeline scene image sequence, and constructing a pipeline three-dimensional reconstruction dataset according to the camera internal parameters, the camera external parameters corresponding to the images in each pipeline scene image sequence, the pipeline scene image sequence and a corresponding real depth map comprise:

performing Scale Invariant Feature Transform (SIFT) feature extraction and feature matching on each pipeline scene image sequence, and eliminating false matching point pairs in each matched image pair using an epipolar geometry relationship;

sorting all images according to a number of matching points for each pipeline scene image sequence, with an image with a largest number of matching points as a starting point, and selecting two images with a number of matching point pairs between the two images greater than a first predetermined value and a translation vector between the two images greater than a second predetermined value as an initial image pair; and setting camera external parameters of a first image in the initial image pair as an identity matrix;

calculating camera external parameters of a second image in the initial image pair using the epipolar geometry relationship according to a 2D-2D matching relationship of the initial image pair and the identity matrix, wherein the 2D-2D matching relationship refers to a SIFT feature matching relationship;

triangulating the initial image pair to generate initial pipeline scene three-dimensional points in the pipeline three-dimensional scene;

selecting an optimal image from currently unselected images as a current newly added image according to a number of points with a corresponding relationship between two-dimensional points in the image and currently constructed pipeline scene three-dimensional points and a distribution of the corresponding two-dimensional points in the images, wherein the corresponding two-dimensional points refer to two-dimensional points, which have the corresponding relationship with the currently constructed pipeline scene three-dimensional points, in the image;

obtaining a 2D-3D matching relationship between the current newly added image and each target image according to a 2D-2D matching relationship between the current newly added image and currently selected images, and calculating camera external parameters of the current newly added image using a Random Sample Consensus (RANSAC)-Perspective-n-Point (PnP) method according to the 2D-3D matching relationship and the camera internal parameters, wherein the target image is an image having the 2D-2D matching relationship with the current newly added image among the currently selected images;

triangulating the current newly added image and the target image to generate a newly added pipeline scene three-dimensional point in the pipeline three-dimensional scene; and performing Bundle Adjustment (BA) optimization on the camera external parameters of the currently selected images and the currently constructed pipeline scene three-dimensional points to obtain optimized three-dimensional points and optimized camera external parameters corresponding to the currently selected images;

returning to execute the step of "selecting an optimal image from currently unselected images as a current newly added image according to a number of points with a corresponding relationship between two-dimensional points in the image and currently constructed pipeline scene three-dimensional points and a distribution of the corresponding two-dimensional points in the images" until a newly added image is unable to be selected; and constructing the pipeline three-dimensional reconstruction dataset using the initial image pair and all the newly added images, wherein the pipeline three-dimensional reconstruction dataset comprises all selected images, and a real depth map, camera internal and external parameters, depth information of each pixel point and optimal source view serial number corresponding to each selected image; the selected images comprise the initial image pair and all the newly added images; the real depth map corresponding to each selected image is obtained using the depth camera; the optimal source view serial number corresponding to each selected image is a frame serial number of a plurality of images closest to a frame serial number of the selected image.

2. The method according to claim 1, wherein the training a Fast-MVSNet network using public datasets to obtain a plurality of trained Fast-MVSNet network models comprises:

determining training sample datasets from the DTU dataset, the BlendedMVS dataset and the ETH3D dataset, wherein the training sample datasets comprise a DTU sample dataset, a BlendedMVS sample dataset and an ETH3D sample dataset; and training the Fast-MVSNet network using the DTU sample dataset, the BlendedMVS sample dataset and the ETH3D sample dataset to obtain three trained Fast-MVSNet network models.

3. The method according to claim 2, wherein the training the Fast-MVSNet network using the DTU sample dataset, the BlendedMVS sample dataset and the ETH3D sample dataset to obtain three trained Fast-MVSNet network models comprises:

extracting image features from all corresponding source images and each reference image in each training sample dataset by using a 2D convolutional network, so as to obtain a first reference feature map corresponding to each reference image and a first source feature map corresponding to each source image;

constructing a sparse cost volume for each first reference feature map according to the first reference feature map, each corresponding source feature map and corresponding camera internal and external parameters, regularizing the sparse cost volume through a 3D convolutional network, and performing depth map regression on a regularized result through a differentiable argmax to obtain an initial depth map corresponding to each reference image;

applying a nearest neighbor strategy to each initial depth map to fill holes, so as to obtain a filled depth map;

applying a joint bilateral up-sampling strategy to each filled depth map and a corresponding second reference feature map which is obtained by passing the reference image through a first convolutional network, so as to obtain a dense depth map corresponding to each reference image;

processing the dense depth map, the corresponding camera internal and external parameters, the corresponding reference image and the corresponding source image by using a Gauss-Newton layer, so as to obtain an optimized depth map corresponding to each reference image; and completing the training of the Fast-MVSNet network in a case that a loss function of the Fast-MVSNet network converges, so as to obtain three trained Fast-MVSNet network models.

4. The method according to claim 3, wherein the processing the dense depth map, the corresponding camera internal and external parameters, the corresponding reference image and the corresponding source image by using a Gauss-Newton layer, so as to obtain an optimized depth map corresponding to each reference image comprises:

for each reference image, passing a reference image with ¼ original size and a corresponding source image with ¼ original size through a second convolutional network to obtain a third reference feature map and a corresponding second source feature map;

processing the third reference feature map, the corresponding second source feature map, the corresponding dense depth map and the corresponding camera internal and external parameters by using the Gauss-Newton layer to obtain a first incremental result, and obtaining a primary iteration depth map according to the first incremental result and the dense depth map;

passing a reference image with ½ original size and a corresponding source image with ½ original size through the second convolutional network to obtain a fourth reference feature map and a corresponding third source feature map; and processing the fourth reference feature map, the corresponding third source feature map, the primary iteration depth map and the corresponding camera internal and external parameters by using the Gauss-Newton layer to obtain a second incremental result, and obtaining a secondary iteration depth map, namely, the optimized depth map, according to the second incremental result and the primary iteration depth map.

5. The method according to claim 4, wherein the training a PatchMatchNet network using public datasets to obtain a plurality of trained PatchMatchNet network models comprises:
   training the PatchMatchNet network using the DTU sample dataset, the BlendedMVS sample dataset and the ETH3D sample dataset to obtain three trained PatchMatchNet network models.

6. The method according to claim 5, wherein the training the PatchMatchNet network using the DTU sample dataset, the BlendedMVS sample dataset and the ETH3D sample dataset to obtain three trained PatchMatchNet network models comprises:
   extracting image features for all corresponding source images and each reference image in each training sample dataset by using a feature pyramid to obtain a reference feature map with $\frac{1}{8}$ original size, a reference feature map with $\frac{1}{4}$ original size and a reference feature map with $\frac{1}{2}$ original size corresponding to each reference image, and a source feature map with $\frac{1}{8}$ original size, a source feature map with $\frac{1}{4}$ original size and a source feature map with $\frac{1}{2}$ original size corresponding to each source image;
   for each reference image, setting a plurality of depth hypothesis values for each pixel point in each reference image within a predetermined depth range to obtain a depth initialization result of each reference image;
   executing homography transformation on each reference image according to the reference feature map with $\frac{1}{8}$ original size, the source feature map with $\frac{1}{8}$ original size, the depth initialization result and the corresponding camera internal and external parameters, so as to obtain a first homography transformation result;
   for each reference image, executing matching cost calculation on each depth hypothesis value of each pixel point in the reference image according to the first homography transformation result, the reference feature map with $\frac{1}{8}$ original size and the source feature map with $\frac{1}{8}$ original size, so as to obtain a first matching cost calculation result;
   executing adaptive spatial cost aggregation according to the first matching cost calculation result to obtain a first cost aggregation result, and executing depth map regression on the first cost aggregation result to obtain a depth map with $\frac{1}{8}$ original size corresponding to each reference image;
   up-sampling the depth map with $\frac{1}{8}$ original size of each reference image to obtain a first up-sampled depth map, executing local perturbation on the first up-sampled depth map to obtain a first local perturbation result, and executing adaptive depth propagation on the first local perturbation result to obtain a first adaptive depth propagation result;
   executing homography transformation according to the first adaptive depth propagation result, the reference feature map with $\frac{1}{4}$ original size, the source feature map with $\frac{1}{4}$ original size and the corresponding camera internal and external parameters, so as to obtain a second homography transformation result;
   executing matching cost calculation on each depth hypothesis value of each pixel point in the reference image according to the second homography transformation result, the reference feature map with $\frac{1}{4}$ original size and the source feature map with $\frac{1}{4}$ original size to obtain a second matching cost calculation result;
   executing adaptive spatial cost aggregation according to the second matching cost calculation result to obtain a second cost aggregation result, and executing depth map regression on the second cost aggregation result to obtain a depth map with $\frac{1}{4}$ original size corresponding to each reference image;
   replacing the first up-sampled depth map with the current depth map with $\frac{1}{4}$ original size, and returning to execute the step of "executing local perturbation on the first up-sampled depth map to obtain a first local perturbation result, and executing adaptive depth propagation on the first local perturbation result to obtain a first adaptive depth propagation result" until a number of return iterations reaches a first predetermined number of iterations;
   up-sampling the depth map with $\frac{1}{4}$ original size obtained by a last iteration to obtain a second up-sampled depth map, executing local perturbation on the second up-sampled depth map to obtain a second local perturbation result, and executing adaptive depth propagation on the second local perturbation result to obtain a second adaptive depth propagation result;
   executing homography transformation according to the second adaptive depth propagation result, the reference feature map with $\frac{1}{2}$ original size, the source feature map with $\frac{1}{2}$ original size and the corresponding camera internal and external parameters to obtain a third homography transformation result;
   executing matching cost calculation on each depth hypothesis value of each pixel point in the reference image according to the third homography transformation result, the reference feature map with $\frac{1}{2}$ original size and the source feature map with $\frac{1}{2}$ original size to obtain a third matching cost calculation result;
   executing adaptive spatial cost aggregation according to the third matching cost calculation result to obtain a third cost aggregation result, and executing depth map regression on the third cost aggregation result to obtain a depth map with $\frac{1}{2}$ original size corresponding to each reference image;
   replacing the second up-sampled depth map with the current depth map with $\frac{1}{2}$ original size, and returning to execute the step of "executing local perturbation on the second up-sampled depth map to obtain a second local perturbation result, and executing adaptive depth propagation on the second local perturbation result to obtain a second adaptive depth propagation result" until the number of return iterations reaches a second predetermined number of iterations;
   passing the depth map with $\frac{1}{2}$ original size obtained by the last iteration through a deep residual network to obtain a final depth map; and
   ending the training of the PatchMatchNet network in a case that a loss function of the PatchMatchNet network converges, so as to obtain three trained PatchMatchNet network models.

7. The method according to claim 3, wherein the inputting the pipeline three-dimensional reconstruction dataset into all the trained Fast-MVSNet network models and all the trained PatchMatchNet network models, and evaluating all the trained network models to obtain an optimal network model comprise:
   deeming the pipeline three-dimensional reconstruction dataset as a test dataset, and testing each trained network model using the test dataset to obtain a predicted depth map and a confidence map for each pipeline scene output by each trained network model;

for each confidence map, comparing a confidence value corresponding to each pixel point in the confidence map with a confidence threshold to obtain a comparison result;

projecting a depth prediction value $d_{ref}$ of each pixel point $n_{ref}$ in each reference image to a corresponding pixel point $n_i$ of each source image by using the camera internal and external parameters, and re-projecting a depth value $d_i$ at the pixel point $n_i$ to a corresponding pixel point $n_{ref}$ of the reference image, wherein a corresponding depth value at the pixel point $n'_{ref}$ is $d'_{ref}$;

determining whether the depth prediction value $d_{ref}$ of each pixel point $n_{ref}$ in each reference image satisfies a pixel projection condition on at least v source images to obtain a determination result, wherein the pixel projection condition is as follows:

$$|n'_{ref} - n_{ref}| < 1$$

and $$|d'_{ref} - d_{ref}| \div d_{ref} < 0.01$$

for each predicted depth map, screening out anomalous pixel points in the predicted depth map according to the comparison result and the determination result;

projecting the screened predicted depth map corresponding to each trained network model to a three-dimensional space to obtain a three-dimensional reconstruction point cloud corresponding to each trained network model; and determining the optimal network model according to a number of three-dimensional reconstruction point clouds corresponding to each trained network model, and a mean absolute error and/or absolute relative error between the predicted depth map and the real depth map.

8. A monocular video-based three-dimensional reconstruction and depth prediction system for a pipeline, comprising:

a video collection module, configured to calibrate a depth camera using Zhang's calibration method to obtain camera internal parameters, and to collect monocular videos in different pipeline scenes using a pipeline robot equipped with the depth camera;

a pipeline three-dimensional reconstruction dataset construction module, configured to perform feature extraction and matching and incremental reconstruction on a pipeline scene image sequence composed of each monocular video by applying a COLMAP method, so as to obtain camera external parameters corresponding to images in each pipeline scene image sequence, and to construct a pipeline three-dimensional reconstruction dataset according to the camera internal parameters, the camera external parameters corresponding to the images in each pipeline scene image sequence, the pipeline scene image sequence and a corresponding real depth map;

wherein the applying a COLMAP method to perform feature extraction and matching and incremental reconstruction on a pipeline scene image sequence composed of each monocular video to obtain camera external parameters corresponding to images in each pipeline scene image sequence, and constructing a pipeline three-dimensional reconstruction dataset according to the camera internal parameters, the camera external parameters corresponding to the images in each pipeline scene image sequence, the pipeline scene image sequence and a corresponding real depth map comprise:

performing Scale Invariant Feature Transform (SIFT) feature extraction and feature matching on each pipeline scene image sequence, and eliminating false matching point pairs in each matched image pair using an epipolar geometry relationship;

sorting all images according to a number of matching points for each pipeline scene image sequence, with an image with a largest number of matching points as a starting point, and selecting two images with a number of matching point pairs between the two images greater than a first predetermined value and a translation vector between the two images greater than a second predetermined value as an initial image pair; and setting camera external parameters of a first image in the initial image pair as an identity matrix;

calculating camera external parameters of a second image in the initial image pair using the epipolar geometry relationship according to a 2D-2D matching relationship of the initial image pair and the identity matrix, wherein the 2D-2D matching relationship refers to a SIFT feature matching relationship;

triangulating the initial image pair to generate initial pipeline scene three-dimensional points in the pipeline three-dimensional scene;

selecting an optimal image from currently unselected images as a current newly added image according to a number of points with a corresponding relationship between two-dimensional points in the image and currently constructed pipeline scene three-dimensional points and a distribution of the corresponding two-dimensional points in the images, wherein the corresponding two-dimensional points refer to two-dimensional points, which have the corresponding relationship with the currently constructed pipeline scene three-dimensional points, in the image;

obtaining a 2D-3D matching relationship between the current newly added image and each target image according to a 2D-2D matching relationship between the current newly added image and currently selected images, and calculating camera external parameters of the current newly added image using a Random Sample Consensus (RANSAC)-Perspective-n-Point (PnP) method according to the 2D-3D matching relationship and the camera internal parameters, wherein the target image is an image having the 2D-2D matching relationship with the current newly added image among the currently selected images;

triangulating the current newly added image and the target image to generate a newly added pipeline scene three-dimensional point in the pipeline three-dimensional scene; and performing Bundle Adjustment (BA) optimization on the camera external parameters of the currently selected images and the currently constructed pipeline scene three-dimensional points to obtain optimized three-dimensional points and optimized camera external parameters corresponding to the currently selected images;

returning to execute the step of "selecting an optimal image from currently unselected images as a current newly added image according to a number of points with a corresponding relationship between two-dimensional points in the image and currently constructed pipeline scene three-dimensional points and a distribution of the corresponding two-dimensional points in the images" until a newly added image is unable to be selected; and constructing the pipeline three-dimensional reconstruction dataset using the initial image pair and all the newly added images, wherein the pipeline three-dimensional reconstruction dataset comprises all selected images, and a real depth map, camera internal and external parameters, depth information of each pixel point and optimal source view serial number corresponding to each selected image; the selected images comprise the initial image pair and all the newly added images; the real depth map corresponding to each selected image is obtained using the depth camera; the optimal source view serial number corresponding to each selected image is a frame serial number of a plurality of images closest to a frame serial number of the selected image;

a network training module, configured to train a Fast-MVSNet network and a PatchMatchNet network using public datasets to obtain a plurality of trained Fast-MVSNet network models and a plurality of trained PatchMatchNet network models, wherein the public datasets comprise a DTU dataset, a BlendedMVS dataset, and an ETH3D dataset;

a network testing and screening model, configured to input the pipeline three-dimensional reconstruction dataset into all the trained Fast-MVSNet network models and all the trained PatchMatchNet network models, and to evaluate all the trained network models to obtain an optimal network model, wherein the trained network models comprise all the trained Fast-MVSNet network models and all the trained PatchMatchNet network models; and a three-dimensional reconstruction and depth prediction module, configured to perform three-dimensional reconstruction and depth prediction on a pipeline three-dimensional reconstruction dataset to be processed by using the optimal network model.

* * * * *